US011904739B2

(12) United States Patent
Folk et al.

(10) Patent No.: US 11,904,739 B2
(45) Date of Patent: Feb. 20, 2024

(54) DISC RECLINER MECHANISM FOR USE IN AN AUTOMOTIVE VEHICLE

(71) Applicant: Magna Seating Inc., Aurora (CA)

(72) Inventors: Avery Folk, West Bloomfield, MI (US); Kristof M Kurzeja, Commerce Township, MI (US); Kai Zhao, Rochester Hills, MI (US); Louis Vetere, II, Commerce Township, MI (US); Detjon Marini, White Lake, MI (US); Cheikh Dioum, Farmington Hills, MI (US); James Rudberg, Northville, MI (US); Creston A Zang, Northville, MI (US); Donald W Gray, Jr., Brighton, MI (US)

(73) Assignee: Magna Seating Inc., Aurora (CA)

( * ) Notice: Subject to any disclaimer, the term of this patent is extended or adjusted under 35 U.S.C. 154(b) by 153 days.

(21) Appl. No.: 17/425,776

(22) PCT Filed: Jan. 24, 2020

(86) PCT No.: PCT/US2020/014947
§ 371 (c)(1),
(2) Date: Jul. 26, 2021

(87) PCT Pub. No.: WO2020/154590
PCT Pub. Date: Jul. 30, 2020

(65) Prior Publication Data
US 2022/0185152 A1  Jun. 16, 2022

Related U.S. Application Data

(60) Provisional application No. 62/796,600, filed on Jan. 25, 2019.

(51) Int. Cl.
*B60N 2/235* (2006.01)

(52) U.S. Cl.
CPC .................................. *B60N 2/236* (2015.04)

(58) Field of Classification Search
CPC ........................................................ B60N 2/236
See application file for complete search history.

(56) References Cited

U.S. PATENT DOCUMENTS 6,626,495 B2  9/2003  Okazaki et al.
6,799,806 B2  10/2004  Eppert et al.
(Continued)

FOREIGN PATENT DOCUMENTS

FR          3032658        8/2016
JP      2015077857 A  *  4/2015

*Primary Examiner* — Anthony D Barfield
(74) *Attorney, Agent, or Firm* — Miller Canfield

(57) ABSTRACT

A disc recliner mechanism for use in an automotive vehicle includes a plurality of pawls and a cam mounted between a guide plate and a tooth plate. Rotation of the cam moves the pawls between an extended position in which the pawls engage the tooth plate to lock the disc recliner mechanism and a retracted position in which the pawls disengage the tooth plate to unlock the disc recliner mechanism and allow rotation between the guide plate and the tooth plate. A notch is disposed on an engagement surface of a cam lobe disposed on the cam for reducing friction when the cam lobe engages a cam follower disposed on the pawls. The tooth plate includes a circumferential outer lip with a concentric channel for retaining lubricant and reducing rotational friction between the tooth plate and the guide plate.

38 Claims, 5 Drawing Sheets

(56) References Cited

U.S. PATENT DOCUMENTS

| | | |
|---|---|---|
| 7,360,838 B2 | 4/2008 | Smuk |
| 7,563,049 B2 | 7/2009 | Peters |
| 7,648,204 B2 | 1/2010 | Oki |
| 7,703,852 B2 | 4/2010 | Wahls et al. |
| 7,722,121 B2 | 5/2010 | Fujioka et al. |
| 8,459,743 B2 | 6/2013 | Villarroel |
| 9,162,592 B2 | 10/2015 | Assmann |
| 9,296,315 B2 | 3/2016 | Hellrung |
| 9,308,837 B2 | 4/2016 | Peters |
| 9,481,270 B2 | 11/2016 | Peters et al. |
| 9,796,301 B2 | 10/2017 | Aktas |
| 9,981,570 B2 | 5/2018 | Aktas |
| 2004/0113475 A1 | 6/2004 | Uramichi et al. |
| 2015/0123444 A1 | 5/2015 | Assmann |

\* cited by examiner

DISC RECLINER MECHANISM FOR USE IN AN AUTOMOTIVE VEHICLE

CROSS-REFERENCE TO RELATED APPLICATIONS

This application claims priority to and all the benefits of U.S. Provisional Application 62/796,600, filed on Jan. 25, 2019, which is hereby incorporated by reference in its entirety.

BACKGROUND OF THE INVENTION

1. Field of the Invention

The present invention relates to a disc recliner mechanism for use in an automotive vehicle.

2. Description of Related Art

Disc recliner mechanisms for use in an automotive vehicle are known in the art. Typical disc recliner mechanisms include a guide plate and a tooth plate with an outer lip, wherein the outer lip rotatably engages the guide plate and has a plurality of teeth extending radially inward therefrom. At least one pawl is mounted between the guide plate and tooth plate. The pawl includes a toothed outer edge and a radially inner cam surface. Often a cam is rotatably mounted between the guide plate and the tooth plate. The cam includes a radially outer cam profile with at least one cam lobe, and the cam lobe has an engagement surface for selectively engaging the radially inner cam surface of the pawl. Rotation of the cam moves the pawl between a first position in which the pawl engages the tooth plate to lock the disc recliner mechanism and a second position in which the pawl disengages the tooth plate to unlock the disc recliner mechanism. However, the disc recliner mechanisms known in the art can push grease radially outward from between the tooth plate and the guide plate due to a flat-to-flat contact area where the outer lip of the tooth plate rotatably engages the guide plate, leading to potential grease mitigation and increased friction. Furthermore, the disc recliner mechanisms known in the art can be difficult to operate efficiently due to increased friction when the cam engages the pawl at slow actuation speeds.

SUMMARY OF THE INVENTION

According to one aspect of the invention, a disc recliner mechanism is provided for use in an automotive vehicle. The disc recliner mechanism includes a guide plate and a tooth plate with an outer lip extending circumferentially therearound. The outer lip rotatably engages the guide plate and has a plurality of teeth extending radially inward therefrom. At least one pawl is mounted between the guide plate and tooth plate, and the pawl includes a toothed outer edge and a radially inner cam surface. A cam is rotatably mounted between the guide plate and the tooth plate. The cam includes a radially outer cam profile for selectively engaging the radially inner cam surface of the pawl. Rotation of the cam moves the pawl between an extended position in which the pawl engages the tooth plate to lock the disc recliner mechanism and a retracted position in which the pawl disengages the tooth plate to unlock the disc recliner mechanism. Additionally, the outer lip of the tooth plate includes a channel for retaining lubricant and reducing rotational friction between the tooth plate and the guide plate.

According to another aspect of the invention, a disc recliner mechanism is provided for use in an automotive vehicle. The disc recliner mechanism includes a guide plate and a tooth plate with an outer lip extending circumferentially therearound. The outer lip has a plurality of teeth extending radially inward therefrom. At least one pawl is mounted between the guide plate and tooth plate, and the pawl includes a toothed outer edge and a radially inner cam surface with at least one cam follower. A cam is rotatably mounted between the guide plate and the tooth plate. The cam includes a radially outer cam profile with at least one cam lobe, and the cam lobe has an engagement surface for selectively engaging the radially inner cam surface of the pawl. Rotation of the cam moves the pawl between an extended position in which the pawl engages the tooth plate to lock the disc recliner mechanism and a retracted position in which the pawl disengages the tooth plate to unlock the disc recliner mechanism. The engagement surface of the cam lobe includes a notch to create a gap between the cam lobe and the cam follower for reducing friction therebetween when the cam lobe selectively engages the cam follower.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 1:
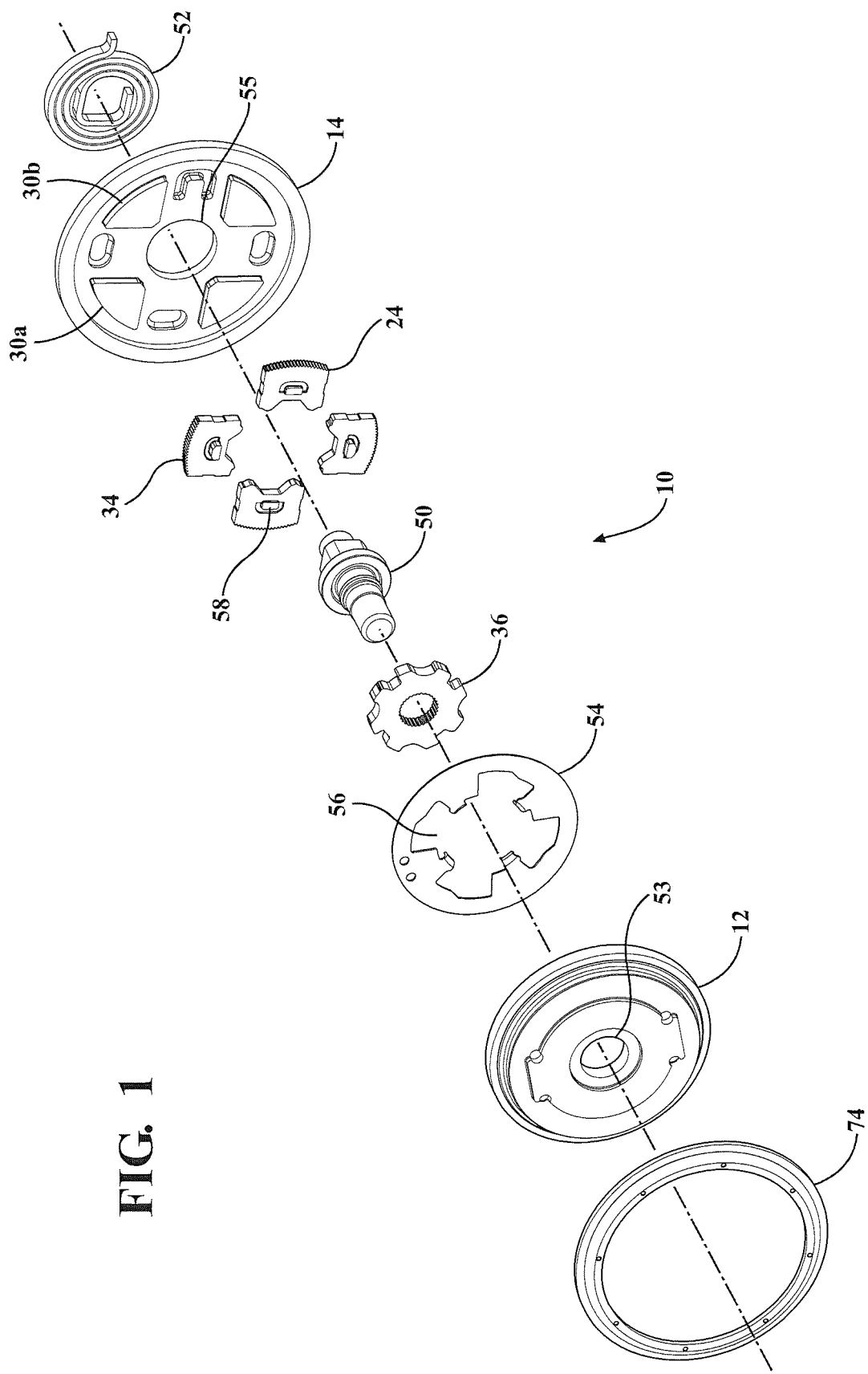
FIG. 1 is an exploded view of a disc recliner according to a primary embodiment of the present invention.

Referring to the Figures, wherein like numerals indicate like or corresponding parts throughout the several views, a disc recliner mechanism for use in an automotive vehicle is shown generally at 10. The disc recliner mechanism 10 includes a tooth plate 12 rotatably coupled to a guide plate 14. A radially outer lip 16 extends circumferentially around the tooth plate 12 and includes an axially outer surface 18 and opposite, substantially parallel, radially outer and radially inner edges 20, 22. A plurality of teeth 23 extend radially inward from the inner edge 22 of the tooth plate 12. A plurality of pawls 24 with opposite, substantially parallel, first and second sides 26, 28 are oriented between a pair of guides 30a, 30b extending axially from the guide plate 14.

Each pair of guides 30a, 30b is laterally spaced apart and has opposing, substantially parallel, inner guiding surfaces 32a, 32b that engage the first and second sides of each pawl 26, 28. Each pawl 24 further includes a toothed radially outer edge 34 disposed between the first and second sides 26, 28 that is capable of selectively and complementarily engaging the teeth 23 extending from the inner edge 22 of the tooth plate 12.

Figure 2:
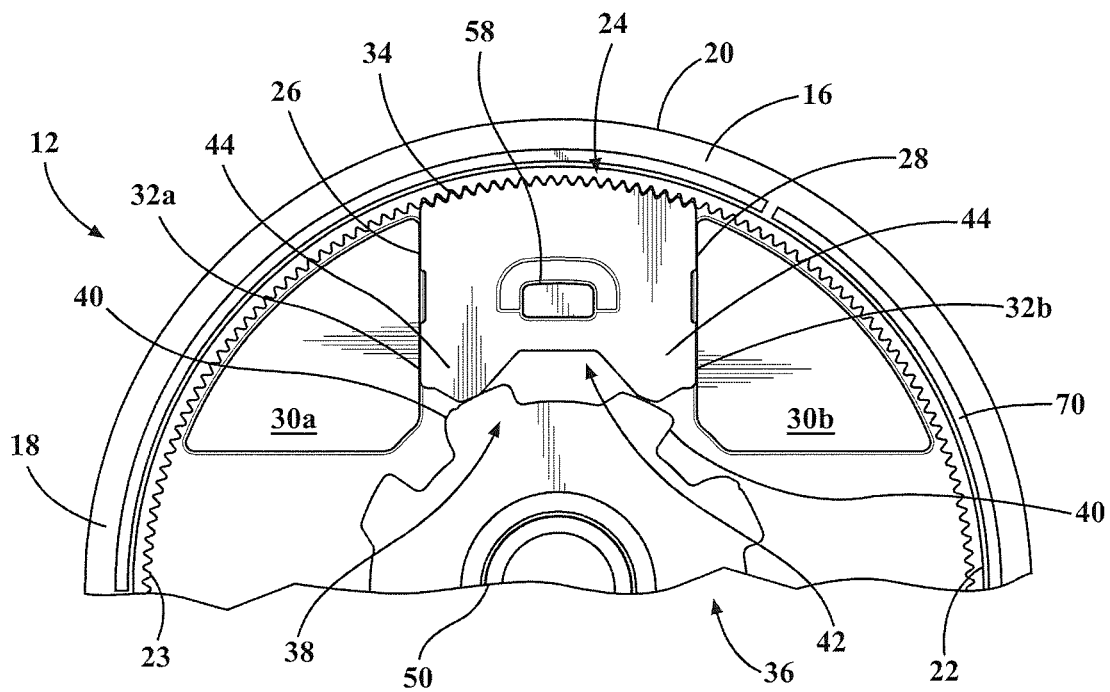
FIG. 2 is a fragmentary cross-sectional view of the disc recliner of FIG. 1 with a pawl in an extended position.
Figure 3:
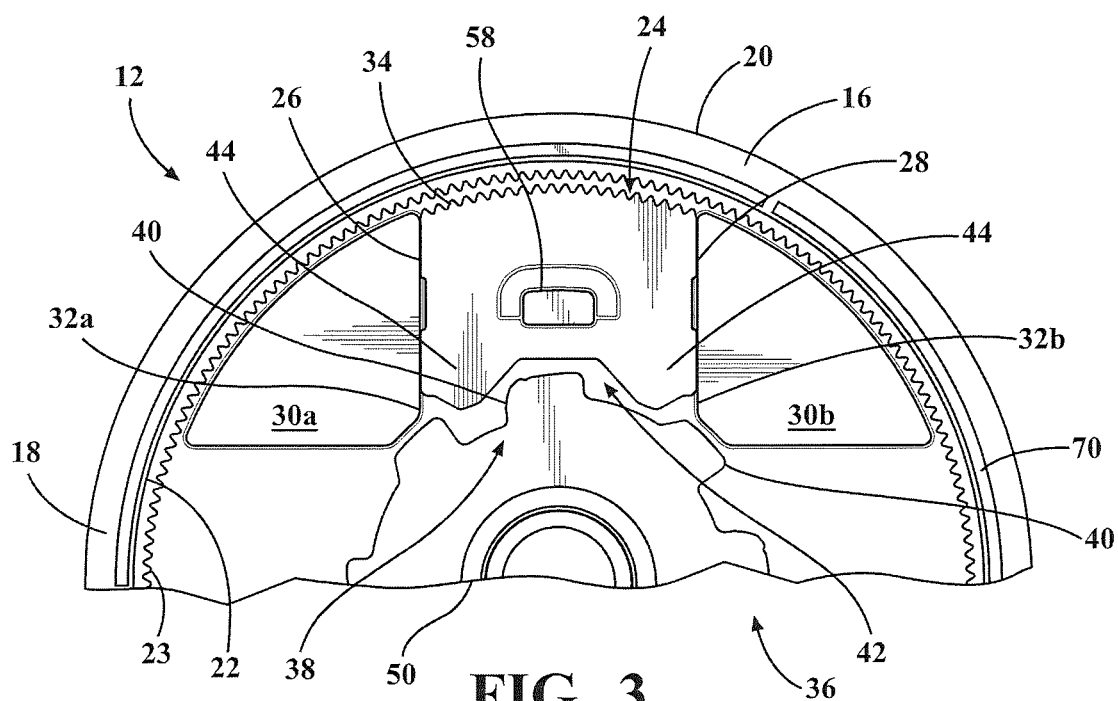
FIG. 3 is a fragmentary cross-sectional view of the disc recliner of FIG. 1 with the pawl in a retracted position.

The disc recliner mechanism 10 further includes a cam 36 rotatably mounted between the tooth plate 12 and the guide plate 14. Referring to FIGS. 2 and 3, rotation of the cam 36 moves the pawls 24 between an extended position in which the toothed edges 34 of the pawls 24 engage the tooth plate 12 to lock the disc recliner mechanism 10 (shown in FIG. 2) and prevent rotation of the tooth plate 12 relative to the guide plate 14, and a retracted position in which the toothed edges 34 of the pawls 24 disengage the tooth plate 12 to unlock the disc recliner mechanism 10 (shown in FIG. 3) and allow rotation of the tooth plate 12 relative to the guide plate 14. The cam 36 includes a radially outer cam profile 38 with at least one cam lobe 40 for selectively engaging a radially inner cam surface 42 of the pawls 24. The radially inner cam surface 42 is disposed on the pawls 24 opposite the toothed edge 34 and extends between the first and second sides 26, 28. At least one cam follower 44 is disposed on the inner cam surface 42 of the pawls 24. The cam lobes 40 each have an engagement surface 46 that selectively contacts the inner cam surface 42 of the pawls 24 as the cam 36 is rotated.

Figure 4:
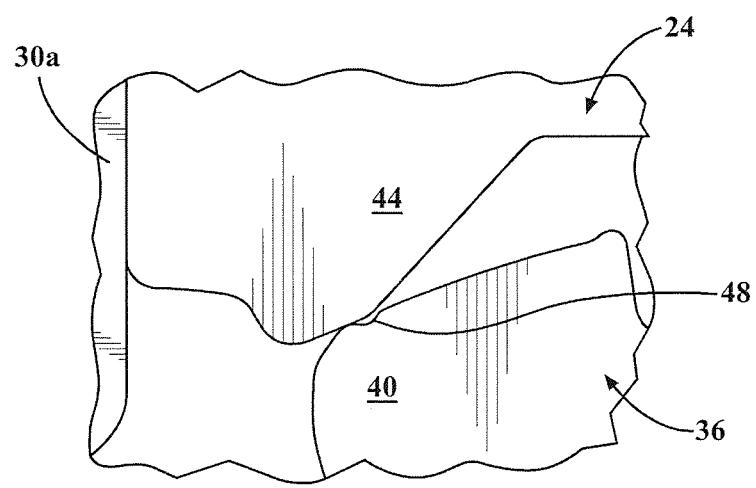
FIG. 4 is an enlarged fragmentary elevation view of the disc recliner of FIG. 1 with a cam engaging the pawl.
Figure 5:
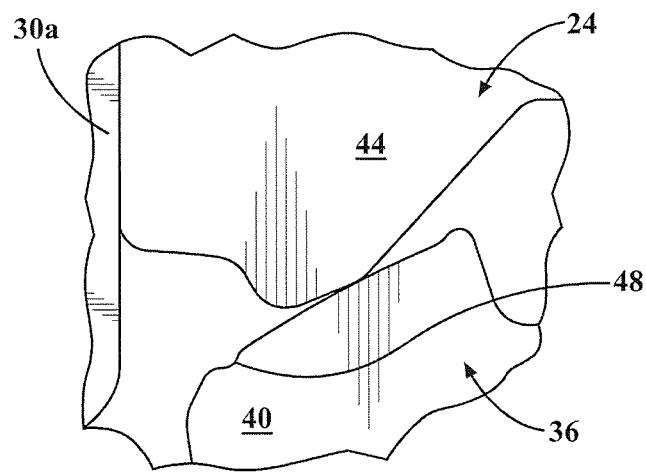
FIG. 5 is an enlarged fragmentary elevation view of the disc recliner of FIG. 1 with the cam further engaging the pawl.
Figure 6:
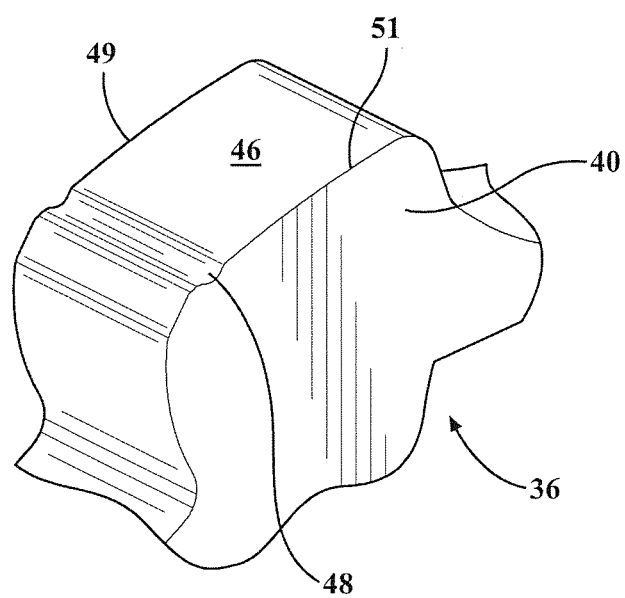
FIG. 6 is an enlarged fragmentary perspective view of a cam lobe and a notch of the disc recliner of FIG. 1.

Referring to FIGS. 4-6, at least one of the cam lobes 40 includes a notch 48 extending axially from a first end 49 to a second end 51 of the engagement surface 46 or between opposite axial sides of the cam 36. The notch 48 creates a gap between the cam lobe 40 and the cam follower 44 to reduce friction during selective sliding engagement of the cam lobe 40 along the cam follower 44. A control mechanism, such as a cam shaft 50 to which a handle or the like may be coupled, is attached to the cam 36 to facilitate rotation thereof. The cam shaft 50 also extends through a central aperture 53 in the tooth plate 12 and a central aperture 55 in the guide plate 14. In a preferred embodiment, the outer cam profile 38 includes first and second cam lobes 40 that correspond to and engage first and second cam followers 44 disposed on the inner cam surface 42 of the pawls 24. The notch 48 is disposed on the engagement surface 46 of the first cam lobe 40. However, it is to be appreciated that the disc recliner mechanism 10 may include any number of notches 48 and any number of cam lobes 40 and cam followers 44 without varying the scope of the invention. Further, it is to be appreciated that the notch 48 may also be placed on any one or any number of the cam lobes 40 to control an amount of friction between the cam lobe 40 and cam follower 44 as desired without varying the scope of the invention.

A spring 52 is operatively coupled to the cam shaft 50 to rotatably bias the cam 36 in a first direction (counterclockwise when viewed from FIGS. 2 and 3) to move the pawls 24 to the extended position. However, it is to be appreciated that alternative means of biasing the pawls 24 to the extended position may be used without varying the scope of the invention. One potential alternative biasing means is a pair of springs 52, where each spring 52 is operatively coupled to opposite sides of the cam 36, as is described in U.S. Pat. No. 8,459,743, the disclosure of which is hereby incorporated by reference in its entirety. Rotation of the cam 36 in the first direction by one or more of the springs 52 causes the cam lobes 40 to engage the cam followers 44, thereby pushing the pawl 24 radially outward between the inner guiding surfaces 32a, 32b of the guides 30a, 30b to the extended position in which the toothed edge 34 of the pawls 24 engages the teeth 23 extending from the tooth plate 12 to lock the disc recliner mechanism 10.

The control mechanism, cam shaft 50, rotates the cam 36 in a second direction (clockwise when viewed from FIGS. 2 and 3) against a biasing force of the spring 52 to move the pawls 24 to the retracted position. A pawl retractor plate 54 is operatively mounted adjacent the cam 36 and rotates in tandem with the cam 36 and the cam shaft 50 to facilitate return of the pawls 24 to the retracted position. The pawl retractor plate 54 includes a plurality of slots 56 for receiving a pip 58 extending axially from each pawl 24. Rotation of the pawl retractor plate 54 in the second direction due to corresponding rotation of the cam shaft 50 and cam 36 in the second direction thereby urges the pawls 24 to move radially inward as the pip 58 of each pawl 24 engages the slots 56 of the pawl retractor plate 54. The pawls 24 are thereby moved to the retracted position in which the toothed edge 34 of the pawls 24 disengages the teeth 23 extending from the tooth plate 12 to unlock the disc recliner mechanism 10. It is also to be appreciated that alternative means of returning the pawls 24 to the retracted position, including various cam lobe 40 and cam follower 44 configurations, may be used without varying the scope of the invention. One such potential configuration of cam lobes 40 and cam followers 44 used to return the pawls 24 to the retracted position is described in U.S. Pat. No. 8,459,743, the disclosure of which is hereby incorporated by reference in its entirety.

Figure 7:
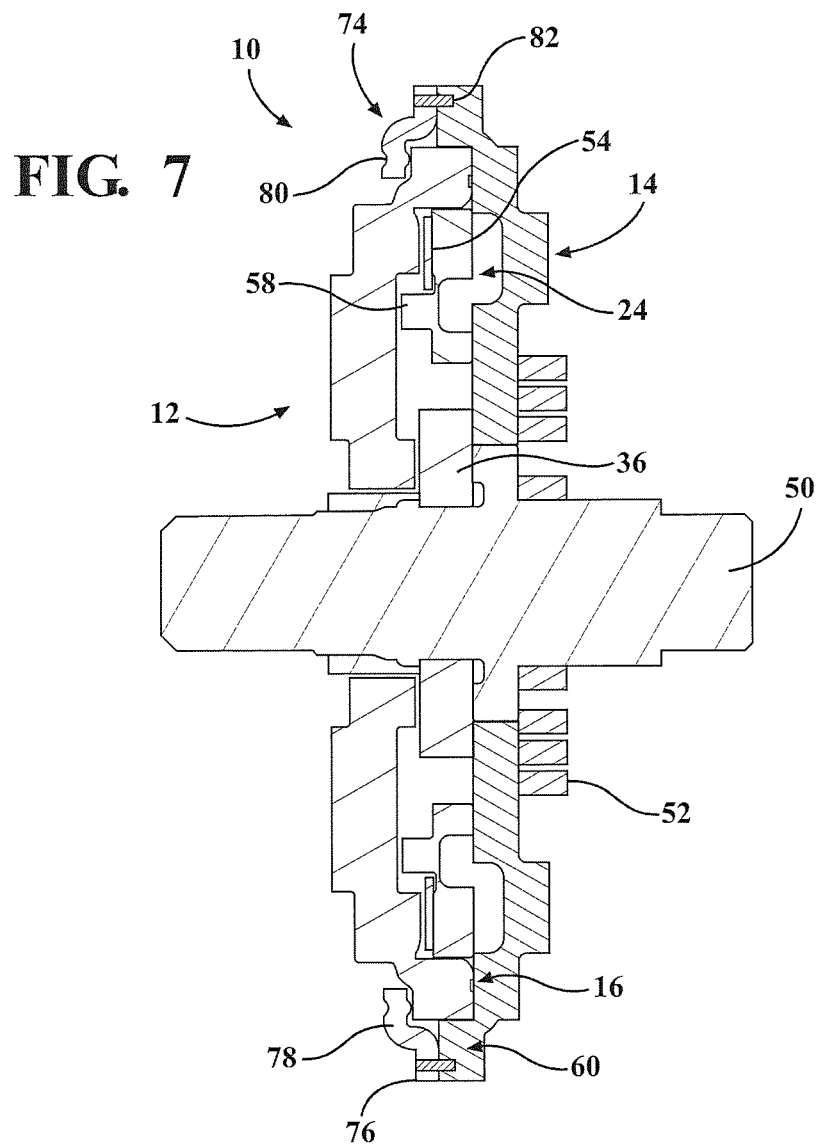
FIG. 7 is a cross-sectional view of the disc recliner of FIG. 1.
Figure 8:
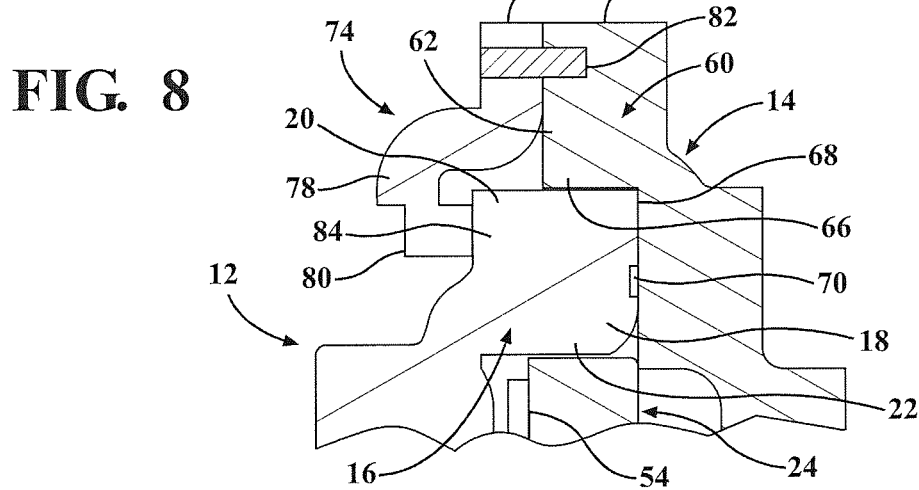
FIG. 8 is a fragmentary cross-sectional view of the disc recliner of FIG. 1.

Referring to FIGS. 7 and 8, a radially outer lip 60 extends circumferentially around the guide plate 14 and includes an axially outer surface 62 and opposite, substantially parallel, radially outer and radially inner edges 64, 66. The outer lip 60 of the guide plate 14 has an outer diameter larger than that of the outer lip 16 of the tooth plate 12. Thus, the outer lip 16 of the tooth plate 12 nests within and is encapsulated by the outer lip 60 of the guide plate 14. The tooth plate 12 and the guide plate 14 are thereby rotatably coupled such that the inner edge 66 of the guide plate 14 contacts the outer edge 20 of the tooth plate 12, and the outer surface 18 of the tooth plate 12 rotatably engages the guide plate 14 at a planar surface 68 disposed substantially perpendicularly from the inner edge 66 of the guide plate 14.

Figure 9:
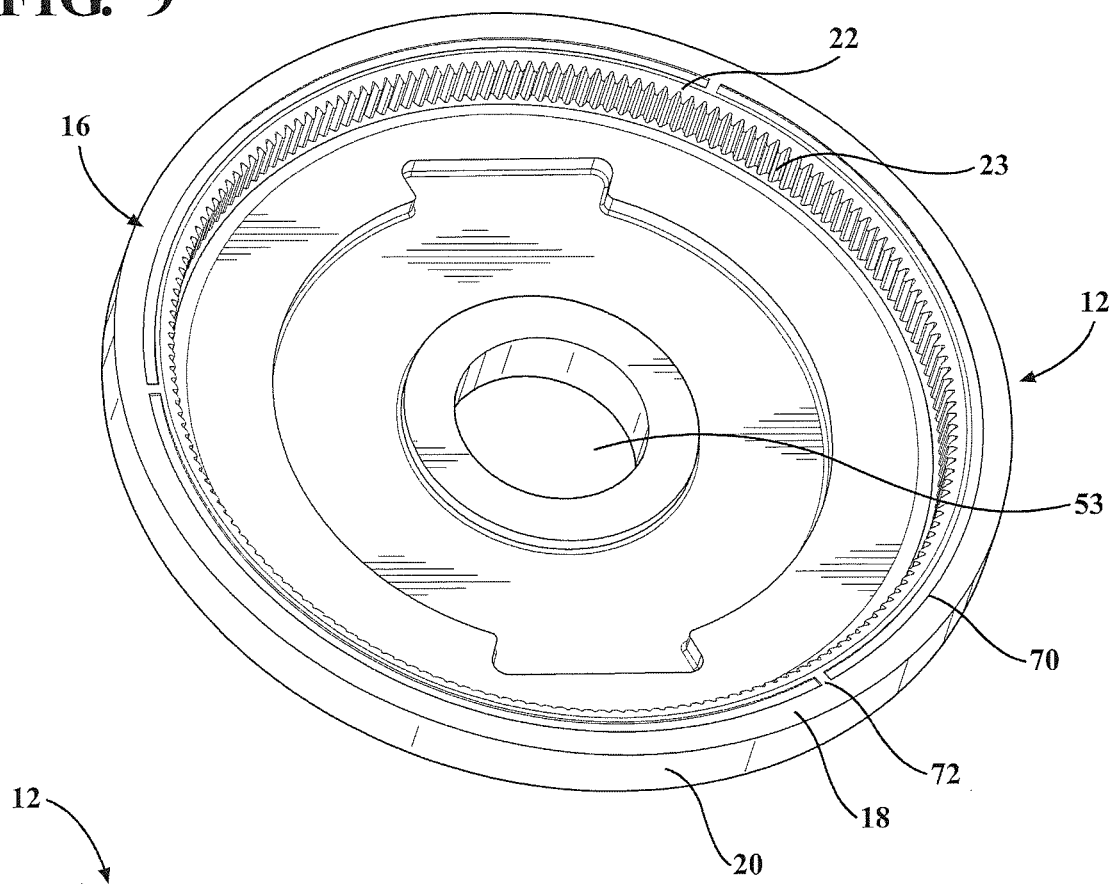
FIG. 9 is a perspective view of a tooth plate of the disc recliner of FIG. 1.
Figure 10:
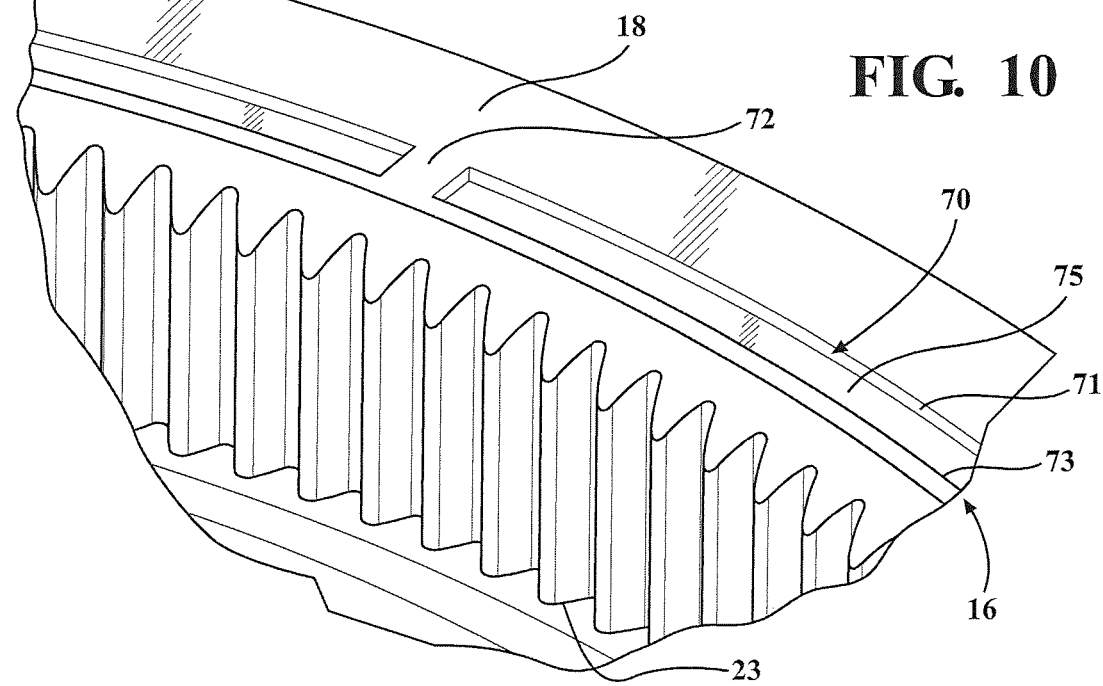
FIG. 10 is an enlarged fragmentary perspective view of the tooth plate of the disc recliner of FIG. 1.

Referring to FIGS. 9 and 10, a channel 70 is recessed in and extends concentrically around the outer surface 18 of the tooth plate 12. The channel 70 has a pair of substantially parallel radially outer and radially inner walls 71, 73 with a channel floor 75 extending between the inner and outer walls 71, 73. The channel 70 eliminates flat-to-flat contact of and helps retain a lubricant, such as grease, between the tooth plate 12 and the guide plate 14, thereby reducing mitigation of the lubricant and reducing friction between the tooth plate 12 and the guide plate 14. A plurality of dividers 72 intersecting the channel 70 may be used to separate the channel 70 into multiple segments, as is shown in FIG. 10. However, it is to be appreciated that the channel 70 may include any number of dividers 72 or may omit the dividers 72 entirely without varying the scope of the invention.

Referring to FIGS. 7 and 8, a stepped retaining ring 74 rotatably secures the tooth plate 12 to the guide plate 14 and includes a radially outer planar edge 76 and a radially inner planar edge 78 with a plurality of axially extending protrusions 80. The outer planar edge 76 of the retaining ring 74 is attached to the outer surface 62 of the guide plate 14 by a weld 82 extending axially into the guide plate 14. The protrusions 80 engage a rear planar surface 84 of the tooth plate 12 disposed opposite from and substantially parallel to the outer surface 18 of the tooth plate 12, thereby preventing axial separation of the tooth plate 12 and the guide plate 14 while still allowing the tooth plate 12 to rotate relative to the guide plate 14. Because the retaining ring 74 is coupled to the outer surface 62 of the guide plate 14 rather than, for instance, extending around the outer edge 64 of the guide plate 14, the retaining ring 74 is ultimately inconsequential to the overall diameter of the disc recliner mechanism 10.

The disc recliner mechanism 10 can be adapted for use in various capacities within the automotive vehicle. In one such capacity, the disc recliner mechanism 10 can be coupled between a seat back and a seat cushion in a seat assembly to allow selective pivotal movement of the seat back relative to the seat cushion. In another such capacity, the disc recliner mechanism 10 can be coupled between the seat cushion and a seat base for allowing the seat assembly to move between numerous positions, including a stowed position, an easy entry position, and a design position.

Referring to operation of the preferred embodiment of the disc recliner mechanism 10, the cam shaft 50 is rotated in the second direction (clockwise when viewed from FIGS. 2 and 3) to overcome the biasing force of the spring 52 and simultaneously rotate the cam 36 and the pawl retractor plate 54 in the second direction. As the pawl retractor plate 54 rotates in the second direction, the slots 56 engage the pips 58 extending from the pawls 24 to move the pawls 24, guided by the guiding surfaces 32a, 32b, radially inward to the retracted position. The toothed edge 34 of the pawls 24 disengages the teeth 23 extending from the tooth plate 12, thereby unlocking the disc recliner mechanism 10 and allowing rotational movement between the guide plate 14 and the tooth plate 12. A user may then rotate the disc recliner mechanism 10 to a desired position. Lubricant displaced radially outward during rotation between the guide plate 14 and the tooth plate 12 is trapped within the channel 70 extending concentrically around the outer surface 18 of the tooth plate 12 to continuously reduce rotational friction therebetween.

Once the user has selected the desired position for the disc recliner mechanism 10, the biasing force of the spring 52 rotates the cam shaft 50 and cam 36 in the first direction (counterclockwise when viewed from FIGS. 2 and 3). As the cam 36 rotates in the first direction, the engagement surfaces 46 of the cam lobes 40 initially engage the cam followers 44, pushing the pawls 24 radially outward, guided by the guiding surfaces 32a, 32b, toward the outer lip 16 of the tooth plate 12. As the cam 36 continues to rotate and the engagement surfaces 46 of the cam lobes 40 slide further across the cam followers 44, the first cam follower 44 skips across the notch 48 in the engagement surface 46 of the first cam lobe 40, thereby reducing friction and easing return of the pawls 24 to the extended position. The cam 36 then comes to rest engaged with the pawls 24 such that the first cam lobe 40 is in full contact with the first cam follower 44, and the second cam lobe 40 is in full contact with the second cam follower 44. The pawls 24 are disposed in the extended position where the toothed edges 34 are engaged with the teeth 23 extending from the inner edge 22 of the tooth plate 12, thereby locking the disc recliner mechanism 10 and preventing rotation of the tooth plate 12 relative to the guide plate 14.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A disc recliner mechanism for use in an automotive vehicle, the disc recliner mechanism comprising:
   a guide plate;
   a tooth plate with an outer lip extending circumferentially therearound and having a plurality of teeth extending radially inward therefrom, the outer lip having an axial outer surface axially facing and rotatably engaging the guide plate;
   at least one pawl mounted between the guide plate and tooth plate, the pawl including a toothed outer edge and a radially inner cam surface; and
   a cam rotatably mounted between the guide plate and the tooth plate, the cam including a radially outer cam profile for selectively engaging the radially inner cam surface of the pawl, wherein rotation of the cam moves the pawl between an extended position in which the pawl engages the tooth plate to lock the disc recliner mechanism, and a retracted position in which the pawl disengages the tooth plate to unlock the disc recliner mechanism; and
   wherein the outer lip of the tooth plate includes a channel recessed in the axial outer surface for retaining lubricant and reducing rotational friction between the tooth plate and the guide plate.

2. The disc recliner mechanism of claim 1 further comprising at least one cam lobe disposed on the radially outer cam profile and at least one cam follower disposed on the radially inner cam surface.

3. The disc recliner mechanism of claim 2 wherein the cam lobe includes an engagement surface for selectively engaging the radially inner cam surface of the pawl.

4. The disc recliner mechanism of claim 3 wherein the engagement surface of the cam lobe includes a notch to create a gap between the cam lobe and the cam follower for reducing friction therebetween when the cam lobe selectively engages the cam follower.

5. The disc recliner mechanism of claim 4 wherein the tooth plate is rotatably coupled to the guide plate and rotation of the cam in a first direction moves the pawl to the extended position to prevent rotation between the tooth plate and the guide plate, and rotation of the cam in a second direction opposite the first direction moves the pawl to the retracted position to allow rotation between the tooth plate and the guide plate.

6. The disc recliner of claim 5 wherein rotation of the cam in the first direction causes the cam lobe to engage the cam follower, thereby moving the pawl to the extended position in which the pawl engages the tooth plate to lock the disc recliner mechanism and prevent rotation between the tooth plate and the guide plate.

7. The disc recliner of claim 6 further comprising a pawl retractor plate operatively mounted adjacent the cam, wherein rotation of the cam simultaneously rotates the pawl retractor plate.

8. The disc recliner mechanism of claim 7 wherein rotation of the pawl retractor plate in the second direction due to rotation of the cam in the second direction moves the pawl radially inward to the retracted position in which the pawl disengages the tooth plate to unlock the disc recliner mechanism and allow rotation between the tooth plate and the guide plate.

9. The disc recliner mechanism of claim 8 wherein the pawl further includes an axially extending pip for engaging the pawl retractor plate when the pawl retractor plate is rotated in the second direction, thereby moving the pawl radially inward to the retracted position.

10. The disc recliner mechanism of claim 9 wherein the guide plate further includes at least one pair of axially extending guides between which the pawl is mounted.

11. The disc recliner mechanism of claim 10 further comprising a cam shaft operatively coupled to the cam.

12. The disc recliner mechanism of claim 11 further comprising a spring operatively coupled to the cam shaft to rotatably bias the cam in the first direction.

13. The disc recliner mechanism of claim 11 further comprising a spring operatively coupled to the cam to rotatably bias the cam in the first direction.

14. The disc recliner mechanism of claim 12 further comprising a retaining ring for rotatably coupling the guide plate and the tooth plate.

15. The disc recliner mechanism of claim 14 wherein the retaining ring includes a radially outer planar edge and a radially inner planar edge with a plurality of axially extending protrusions.

16. The disc recliner mechanism of claim 15 wherein the radially outer planar edge of the retaining ring is attached to the guide plate by an axial weld, and the axially extending protrusions engage the tooth plate to rotatably couple the guide plate and the tooth plate and to prevent axial separation of the guide plate and the tooth plate.

17. The disc recliner mechanism of claim 16 wherein the guide plate includes an outer lip extending circumferentially therearound, the outer lip including opposite radially outer and radially inner edges.

18. The disc recliner mechanism of claim 17 wherein the outer lip of the tooth plate also includes opposite radially outer and radially inner edges, the plurality of teeth extending from the radially inner edge.

19. The disc recliner mechanism of claim 18 wherein the outer lip of the tooth plate is disposed between the outer lip of the guide plate and the toothed outer edge of the pawl such that the radially outer edge of the tooth plate faces the radially inner edge of the guide plate.

20. A disc recliner mechanism for use in an automotive vehicle, the disc recliner mechanism comprising:
   a guide plate;
   a tooth plate with an outer lip extending circumferentially therearound, the outer lip having a plurality of teeth extending radially inward therefrom;
   at least one pawl mounted between the guide plate and tooth plate, the pawl including a toothed outer edge and a radially inner cam surface with at least one cam follower; and
   a cam rotatably mounted between the guide plate and the tooth plate, the cam including a radially outer cam profile with at least one cam lobe, the cam lobe having an engagement surface for selectively engaging the radially inner cam surface of the pawl, wherein rotation of the cam moves the pawl between an extended position in which the pawl engages the tooth plate to lock the disc recliner mechanism, and a retracted position in which the pawl disengages the tooth plate to unlock the disc recliner mechanism; and
   wherein the engagement surface of the cam lobe includes a notch to create a gap between the cam lobe and the cam follower for reducing friction therebetween when the cam lobe selectively engages the cam follower.

21. The disc recliner mechanism of claim 20 wherein the outer lip of the tooth plate rotatably engages the guide plate.

22. The disc recliner mechanism of claim 21 wherein the outer lip of the tooth plate includes a channel for retaining lubricant and reducing rotational friction between the tooth plate and the guide plate.

23. The disc recliner mechanism of claim 22 wherein the tooth plate is rotatably coupled to the guide plate and rotation of the cam in a first direction moves the pawl to the extended position to prevent rotation between the tooth plate and the guide plate, and rotation of the cam in a second direction opposite the first direction moves the pawl to the retracted position to allow rotation between the tooth plate and the guide plate.

24. The disc recliner mechanism of claim 23 wherein rotation of the cam in the first direction causes the cam lobe to engage the cam follower, thereby moving the pawl to the extended position in which the pawl engages the tooth plate to lock the disc recliner mechanism and prevent rotation between the tooth plate and the guide plate.

25. The disc recliner mechanism of claim 24 further comprising a pawl retractor plate operatively mounted adjacent the cam, wherein rotation of the cam simultaneously rotates the pawl retractor plate.

26. The disc recliner mechanism of claim 25 wherein rotation of the pawl retractor plate in the second direction due to rotation of the cam in the second direction moves the pawl radially inward to the retracted position in which the pawl disengages the tooth plate to unlock the disc recliner mechanism and allow rotation between the tooth plate and the guide plate.

27. The disc recliner mechanism of claim 26 wherein the pawl further includes an axially extending pip for engaging the pawl retractor plate when the pawl retractor plate is rotated in the second direction, thereby moving the pawl radially inward to the retracted position.

28. The disc recliner mechanism of claim 27 wherein the guide plate further includes at least one pair of axially extending guides between which the pawl is mounted.

29. The disc recliner mechanism of claim 28 further comprising a cam shaft operatively coupled to the cam.

30. The disc recliner mechanism of claim 29 further comprising a spring operatively coupled to the cam shaft to rotatably bias the cam in the first direction.

31. The disc recliner mechanism of claim 29 further comprising a spring operatively coupled to the cam to rotatably bias the cam in the first direction.

32. The disc recliner mechanism of claim 30 further comprising a retaining ring for rotatably coupling the guide plate and the tooth plate.

33. The disc recliner mechanism of claim 32 wherein the retaining ring includes a radially outer planar edge and a radially inner planar edge with a plurality of axially extending protrusions.

34. The disc recliner mechanism of claim 33 wherein the radially outer planar edge of the retaining ring is attached to the guide plate by an axial weld, and the axially extending protrusions engage the tooth plate to rotatably couple the guide plate and the tooth plate and to prevent axial separation of the guide plate and the tooth plate.

35. The disc recliner mechanism of claim 34 wherein the guide plate includes an outer lip extending circumferentially therearound, the outer lip including opposite radially outer and radially inner edges.

36. The disc recliner mechanism of claim 35 wherein the outer lip of the tooth plate also includes opposite radially outer and radially inner edges, the plurality of teeth extending from the radially inner edge.

37. The disc recliner mechanism of claim 36 wherein the outer lip of the tooth plate is disposed between the outer lip of the guide plate and the toothed outer edge of the pawl such that the radially outer edge of the tooth plate faces the radially inner edge of the guide plate.

38. A disc recliner mechanism for use in an automotive vehicle, the disc recliner mechanism comprising:
- a guide plate;
- a tooth plate with an outer lip extending circumferentially therearound the outer lip rotatably engaging the guide plate and having a plurality of teeth extending radially inward therefrom, wherein the outer lip of the tooth plate includes a channel for retaining lubricant and reducing rotational friction between the tooth plate and the guide plate;
- at least one pawl mounted between the guide plate and tooth plate, the pawl including a toothed outer edge and a radially inner cam surface; and
- a cam rotatably mounted between the guide plate and the tooth plate, the cam including a radially outer cam profile for selectively engaging the radially inner cam surface of the pawl, wherein rotation of the cam moves the pawl between an extended position in which the pawl engages the tooth plate to lock the disc recliner mechanism, and a retracted position in which the pawl disengages the tooth plate to unlock the disc recliner mechanism;
- at least one cam lobe disposed on the radially outer cam profile and at least one cam follower disposed on the radially inner cam surface, wherein the cam lobe includes an engagement surface for selectively engaging the radially inner cam surface of the pawl; and
- wherein the engagement surface of the cam lobe includes a notch to create a gap between the cam lobe and the cam follower for reducing friction therebetween when the cam lobe selectively engages the cam follower.

* * * * *